United States Patent
Brazier (10) Patent No.: US 11,426,615 B2
(45) Date of Patent: Aug. 30, 2022

(54) EXPLOSION FLAP VALVE

(71) Applicant: BS&B Innovations Limited, Limerick (IE)

(72) Inventor: Geoffrey Brazier, Woodbury, MN (US)

(73) Assignee: BS&B Innovations Limited, Limerick (IE)

(*) Notice: Subject to any disclaimer, the term of this patent is extended or adjusted under 35 U.S.C. 154(b) by 179 days.

(21) Appl. No.: 16/614,842

(22) PCT Filed: May 21, 2018

(86) PCT No.: PCT/US2018/033616
§ 371 (c)(1),
(2) Date: Nov. 19, 2019

(87) PCT Pub. No.: WO2018/213820
PCT Pub. Date: Nov. 22, 2018

(65) Prior Publication Data
US 2020/0086150 A1      Mar. 19, 2020

Related U.S. Application Data (60) Provisional application No. 62/508,426, filed on May 19, 2017.

(51) Int. Cl.
*A62C 2/12* (2006.01)
*F16K 17/36* (2006.01)

(52) U.S. Cl.
CPC .............. *A62C 2/12* (2013.01); *F16K 17/363* (2013.01)

(58) Field of Classification Search
CPC .... A62C 2/12; A62C 3/14; A62C 4/02; A62C 4/04; F16K 17/363
See application file for complete search history.

(56) References Cited

U.S. PATENT DOCUMENTS

| | | | | |
|---|---|---|---|---|
| 5,894,856 | A * | 4/1999 | Swenson | F16K 17/363 137/38 |
| 10,315,059 | B2 * | 6/2019 | Kowalski | F16K 17/164 |
| 10,480,666 | B2 * | 11/2019 | Balcarczyk | F16K 17/164 |

(Continued)

FOREIGN PATENT DOCUMENTS

| | | |
|---|---|---|
| CN | 106422118 A | 2/2014 |
| DE | 102013013209 A1 | 3/2014 |
| RU | 2195984 C2 | 1/2003 |

OTHER PUBLICATIONS

International Search Report in corresponding PCT Application No. PCT/US2018/033616 dated Jul. 20, 2018 (2 pages).

*Primary Examiner* — Ryan A Reis
(74) *Attorney, Agent, or Firm* — Finnegan, Henderson, Farabow, Garrett & Dunner, LLP (57) ABSTRACT

An explosion isolation device is disclosed. The explosion isolation device may comprise a conduit having a flap configured to rotate between an open position and a closed position within the conduit, and a holding mechanism configured to hold the flap in the open position. The holding mechanism may be configured to release the flap in the event of an explosion and the flap may be configured to rotate into the closed position after it is released. The device may include a sensor and an actuator configured to actuate the holding mechanism when an explosion is sensed. The conduit may be vertical.

16 Claims, 13 Drawing Sheets

(56) References Cited

U.S. PATENT DOCUMENTS

| | | | |
|---|---|---|---|
| 2010/0096022 A1* | 4/2010 | Tozandehjani | F16K 17/363 137/38 |
| 2012/0048399 A1* | 3/2012 | Zellweger | F16K 17/34 137/527 |
| 2015/0238787 A1* | 8/2015 | Van Gelder | A62C 3/04 169/45 |
| 2016/0061339 A1* | 3/2016 | Zellweger | F16K 15/03 137/461 |
| 2016/0296779 A1* | 10/2016 | Almutairi | A62C 3/06 |

* cited by examiner

EXPLOSION FLAP VALVE

CROSS-REFERENCE TO RELATED PATENT APPLICATIONS

This is a National Phase of International Application No. PCT/US2018/033616, filed May 21, 2018, which claims the benefit of U.S. Provisional Application No. 62/508,426 filed May 19, 2017. The entire contents of the above-referenced applications are expressly incorporated herein by reference.

FIELD

This disclosure generally relates to a system for isolating an explosion or combustion in a volume. More specifically, this disclosure relates to a flap-type valve configured to close off a conduit in the event of an explosion or combustion, to prevent the effects of an explosion or combustion from propagating through the conduit.

BACKGROUND

An explosion isolation system may be used to isolate an explosion in a protected area. A protected area may be, for example, a process enclosure, such as a grain silo or dust collector, or any other fully or partially enclosed volume for which explosion protection and/or prevention may be desired. The protected system may contain combustible dust, combustible gases, and/or other explosion- or combustion-prone conditions.

In the case of a dust collector, for example, dirty air may be fed into the intake of the dust collector, typically via an inlet duct. The dust collector may then pass the air through one or more filter bags, which trap and collect particulates, so that clean air can be evacuated from the dust collector via its outlet. A significant risk of explosion or combustion may arise due to the concentration of particulates in the air inside the dust collector. Left unaddressed, such an explosion or combustion may tend to propagate upstream (e.g., through the intake opposite the direction of normal air inflow).

One known device to protect against the upstream propagation of an explosion is a "flap valve." A known flap valve is positioned at a point upstream from the protected volume (e.g., dust collector) within a horizontal duct feeding air into the protected volume ("infeed duct"). The flap valve has a flap that is configured to rotate freely within a horizontal infeed duct, such that in the absence of sufficient process air flow (e.g., when the system is not operating), the flap will hang downward due to gravity, blocking the horizontal infeed duct. As such, the flap is "normally closed." During operation, the flow of air through the infeed duct moves the flap open in proportion to the flow velocity. The flap is intended to open to its maximum ability once the minimum design flow velocity is reached.

In the event of a deflagration in the protected volume, a wave of pressure moves upstream (against the direction of normal air inflow) in advance of a propagating flame, and forces the flap valve to close milliseconds before the propagating flame arrives. Once closed, the flap prevents the flame (as well as projectiles and other explosion hazards) from propagating upstream, thereby isolating the explosion. Typically, the known flap valve is configured to latch in the closed position following an explosion. Latching shut may prevent the flap from opening in response to pressure fluctuations following an explosion, and thereby prevent hot particles from breaching the valve and becoming an ignition source on the upstream side of the valve.

The present disclosure recognizes a number of drawbacks associated with known flap valves. Existing flap valves depend on gravity as part of the force to aid rotational movement or to close the flap; therefore, they must be installed within horizontal ducting or piping, which limits system design. In addition, existing flap valves are "normally closed," and require air flow to open them. This reliance on air flow to open the flap creates complications within the system, including pressure drops, turbulence, and loss of product carried in the air flow. Those complications pose operational and maintenance risks, and may impair the reliability of known flap valves.

Existing flap valves also are non-inspectable, and lack any mechanism to check their condition or ability to function. Inspectability is desirable, because the condition of a flap valve may change over time due to the wear and tear of the application, such as accumulation of particulates on the flap. The art typically positions the flap valve a sufficient distance upstream from the protected volume, effectively giving the flap valve time to close before a propagating flame can reach it even if the valve condition/operability has deteriorated. That solution, however, increases the space requirements of the system and limits design flexibility. The ability to inspect or check the condition or functionality of a flap would allow the flap valve user to verify that the safety device is able to respond according to its factory settings and/or design conditions for its application position relative to the protected volume.

Existing flap valves also are passive devices, which depend on the reverse air flow from a deflagration to close the flap. Although passive flap valves have generally been favored due to their low cost, the capabilities of a passive flap valve are somewhat limited. The present disclosure recognizes the need for an active flap valve, which may be triggered to close in response to a detected condition (e.g., a measured pressure, pressure change, temperature, radiation) indicating that a deflagration has occurred or will soon occur. The present disclosure also recognizes the need for a flap valve that can be caused to close more quickly than can be achieved by reverse air flow alone. In addition, existing passive flap valves are responsive only to a deflagration from a single direction (e.g., from the downstream side). There is a need for an active flap valve that can be triggered to close in response to a deflagration or other detected condition from either or both of the upstream and downstream directions.

The present disclosure addresses many of the foregoing drawbacks of conventional flap valves, and provides many of the foregoing desirable features in an improved flap valve. The present disclosure also addresses other drawbacks in the prior art and/or provides other benefits, as will be understood from the drawings and description herein.

SUMMARY

To overcome one or more of the deficiencies above, provide one or more of the desired advantages above, or to overcome other deficiencies and/or provide other benefits, as embodied and described herein, the disclosure is directed to an explosion isolation device, which may comprise a conduit and a flap within the conduit. The flap may be configured to rotate between an open position and a closed position within the conduit. A holding mechanism may be configured to hold the flap in the open position. The holding mechanism may be configured to release the flap in the event of an explosion, and the flap may be configured to rotate into the closed position after it is released.

BRIEF DESCRIPTION OF THE DRAWINGS

The accompanying drawings, which are incorporated in and constitute a part of this specification, illustrate several embodiments and together with the description, serve to explain principles of the disclosure.

DESCRIPTION OF THE EMBODIMENTS

Reference will now be made in detail to the present exemplary embodiments, examples of which are illustrated in the accompanying figures.

Figure 1A:
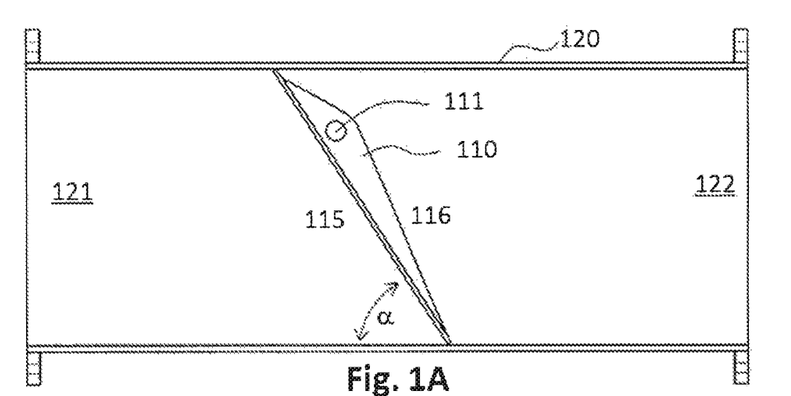
FIGS. 1A-1C illustrate side cross-sectional views of a flap valve assembly.
Figure 1B:
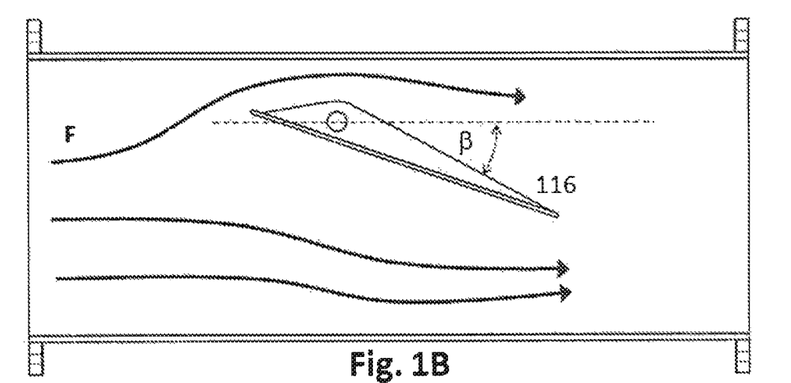
Figure 1C:
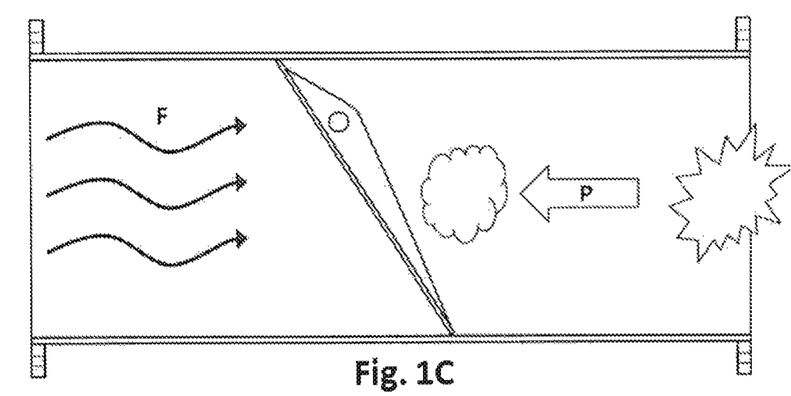

As illustrated in FIGS. 1A-1C, a flap valve may include a flap 110 rotatably mounted within a conduit 120, via rotatable shaft 111. As illustrated, flap 110 has an upstream side 115 and a downstream side 116. During normal operation, illustrated in FIG. 1B, the flap 110 is open, allowing air flow F to pass in a downstream direction, from the inlet 21 to the outlet 122 of the conduit. In the event of a downstream deflagration, illustrated in FIG. 1C, a pressure wave P moves upstream, against the direction of air flow F. Flap 110 closes to prevent a flame, projectiles, ignition sources, or other results of the deflagration from continuing upstream past the flap 110.

A conventional flap valve is normally closed, meaning that in the absence of an airflow F (FIG. 1B) sufficient to force the flap open, gravity keeps the flap in the closed position (e.g., as illustrated in FIG. 1A). In contrast, in one embodiment of the present disclosure, the flap 110 is held in a normally open position (e.g., as illustrated in FIG. 1B) even without any airflow F.

As discussed in more detail below, including in connection with FIGS. 5A-5D, 6A, 6B, 7, 9A-9B, 10-10B, 11, and 12, a flap 110 may be held in a normally open position by a holding mechanism such as a latch, a destructible failure member, or any mechanism configured to keep a flap from rotating into a closed position. In one embodiment, the holding mechanism may be configured to release the flap 110 as a result of the pressure from pressure wave P acting on the downstream side 116 of the flap 110. When the holding mechanism is a latch, for example, the flap 110 may be configured to close when the force exerted on the downstream side 116 of the flap 110 is sufficient to overcome the force holding the latch in place. As another example, when the holding mechanism is a destructible failure member, the flap 110 may be configured to close when the force exerted on the downstream side 116 of the flap 110 is sufficient to cause the destructible failure member to fail.

Although the conduit 120 is depicted as a horizontal conduit in FIGS. 1A-1C, the conduit alternatively may be vertical or may be oriented in any non-vertical or non-horizontal orientation. Whereas conventional flap valves must be installed within a horizontal conduit so they may be held in their normally closed position by gravity, the present disclosure is not so limited. Specifically, when the flap 110 is held in a normally-open configuration (e.g., through use of a holding mechanism), the normal position of the flap 10 may be independent of gravity.

As illustrated in FIG. 1B, the flap 110 in the normally open position may be kept at an angle to expose the downstream side 116 of the flap to airflow and force caused by pressure wave P (FIG. 1C). The present disclosure, however, is not limited to such a configuration. For example, in the embodiment illustrated in FIG. 2B, a flap 210 may be kept at a normally open position substantially parallel to the conduit 220 and, thus, substantially parallel to the prevailing directions of airflow F (FIG. 2B) and pressure P (FIG. 2C) resulting from a downstream deflagration. Maintaining a normally open flap 210 in the substantially parallel orientation illustrated in FIG. 2B may provide advantages, including reduced pressure drop and reduced turbulence as air flow F moves through the conduit 220. In addition, the substantially parallel orientation of flap 210 in FIG. 2B will reduce the effect of backpressure P on the downstream side 216 on the flap 210 until the flap 110 has begun to rotate into the closed position illustrated in FIG. 2C. Reducing the effect of backpressure P in such a fashion may be desirable, for example, in the case of an actuated flap valve, such as those illustrated in FIGS. 9A-12 and described more fully below. For example, it may be desired to ensure that the valve will be caused to close solely or primarily based on triggering of the actuator, and not (or not primarily) based on the effect of backpressure P.

Figure 2A:
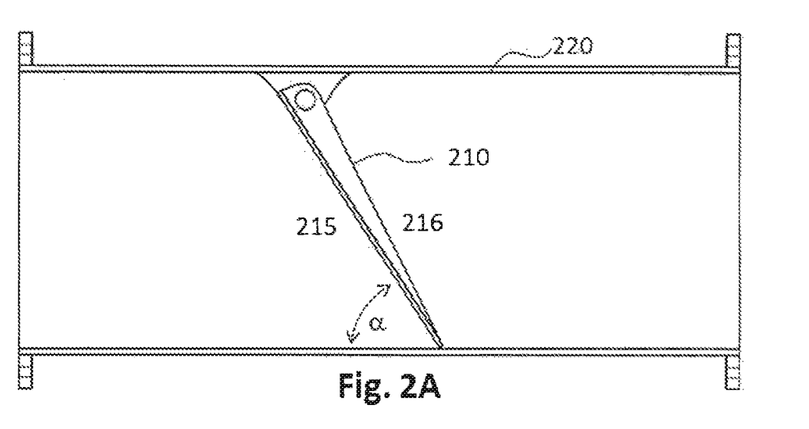
FIGS. 2A-2C illustrate side cross-sectional views of another embodiment of a flap valve assembly.
Figure 2B:
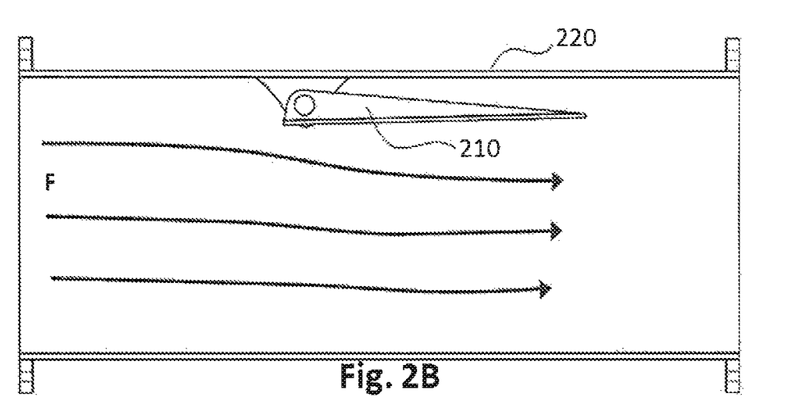
Figure 2C:
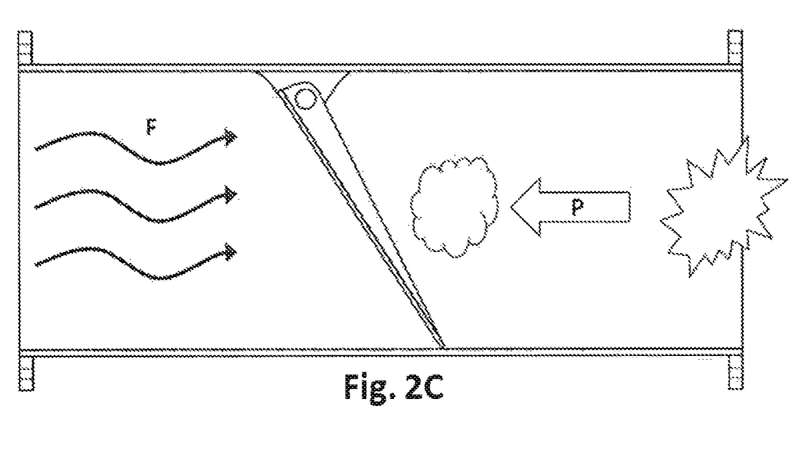

FIGS. 2A-2C depict the flap 210 rotatably mounted at the top of the conduit 220, such that all airflow F passes beneath the flap during normal operation (FIG. 2B). As illustrated in FIGS. 1A-1C, however, the present disclosure also contemplates that a rotatable shaft 111 may pass through the sides of the conduit, such that airflow F may pass both above and beneath the flap during normal operation (FIG. 1B).

Figure 3A:
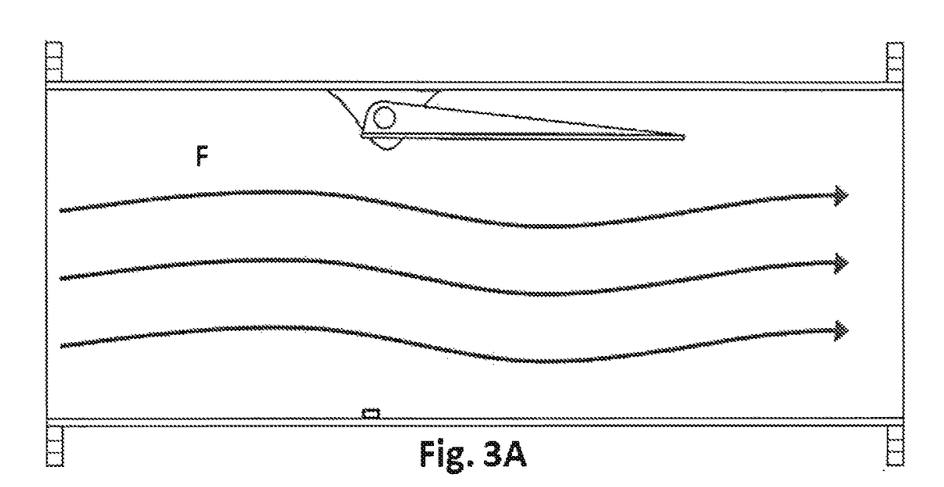
FIGS. 3A-3B illustrate side cross-sectional views of yet another embodiment of a flap valve assembly.
Figure 3B:
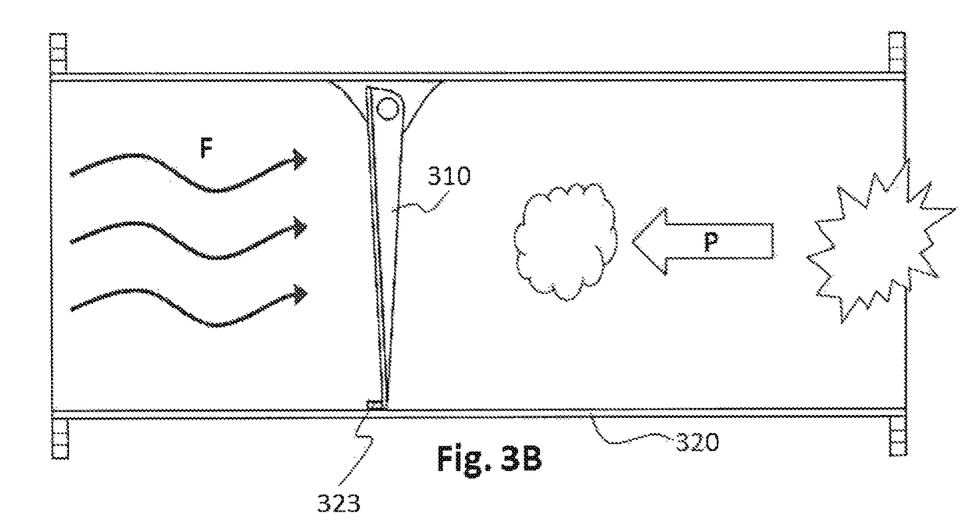

Although the flap 110, 210 in FIGS. 1A and 2A is depicted as forming an acute angle α with the bottom of the conduit 120, 220 when in the closed position, the disclosure is not limited to that configuration. For example, as illustrated in FIGS. 3A and 3B, a flap 310 may form a right angle with the bottom of the conduit 320 when in the closed position. In such an embodiment, a stopper 323 may be provided to prevent the flap 320 from over-rotating past the closed position.

Figure 4A:
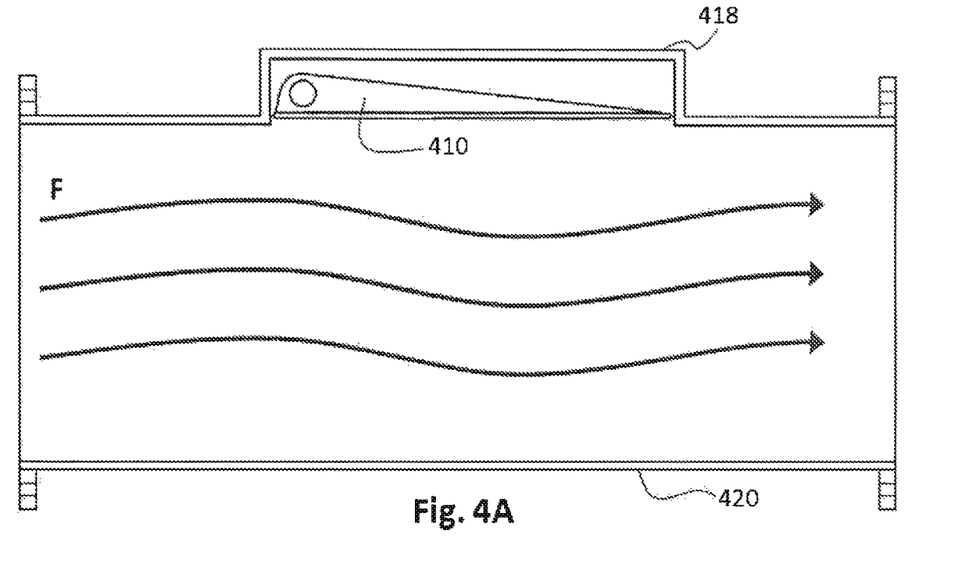
FIGS. 4A-4B illustrate side cross-sectional views of still another embodiment of a flap valve assembly.
Figure 4B:
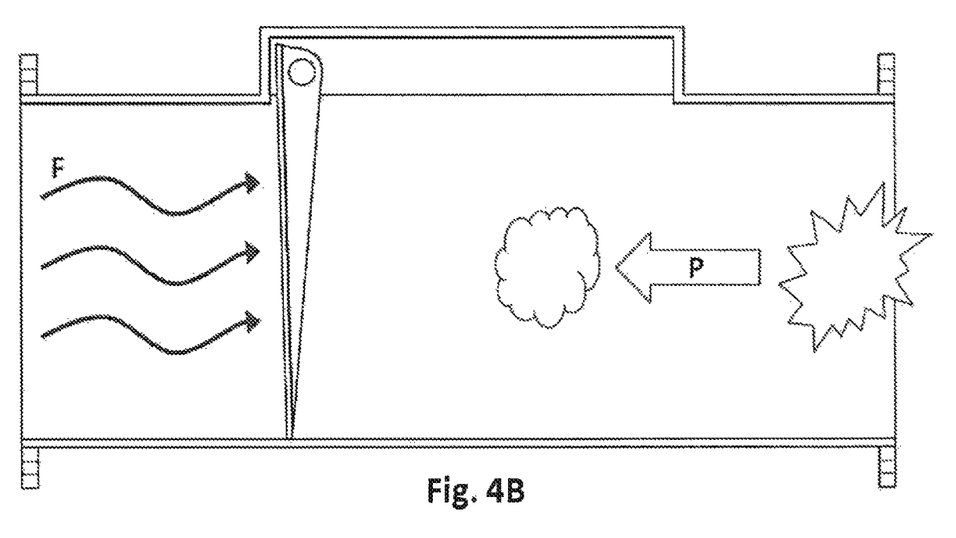

In another embodiment, illustrated in FIG. 4A, a normally open flap 410 may be positioned above the flow path in a conduit 420. The flap 410 may, for example, be positioned in a recess in the conduit 420. Alternatively, the flap 410 may be installed in a flap housing 418 that is positioned above an opening in the conduit 420. In such a configuration, the flap 410 is kept largely out of the path of air flow F until the flap valve is closed, as illustrated in FIG. 4B. Positioning a normally open flap 410 above the flow path as illustrated in FIG. 4A may advantageously minimize pressure drop and turbulence of the air flow F through the conduit 420.

Figure 5A:
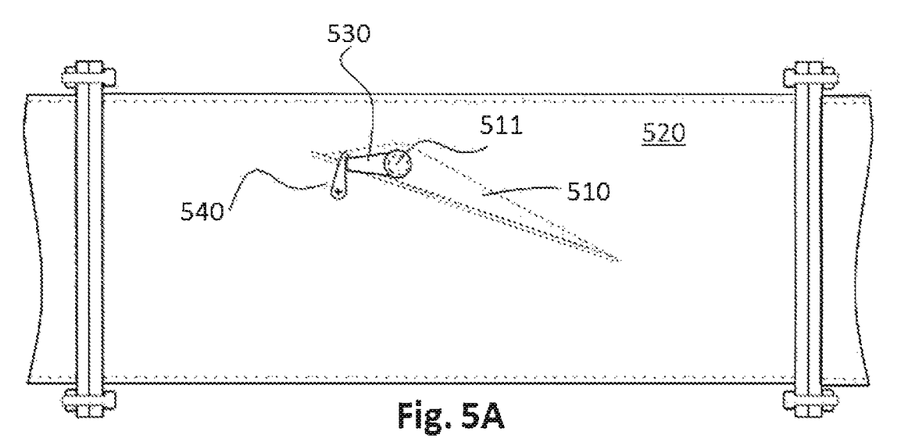
FIGS. 5A-5B illustrate a side view of a flap valve assembly with a latch configured to maintain the flap in a normal-open configuration.
Figure 5B:
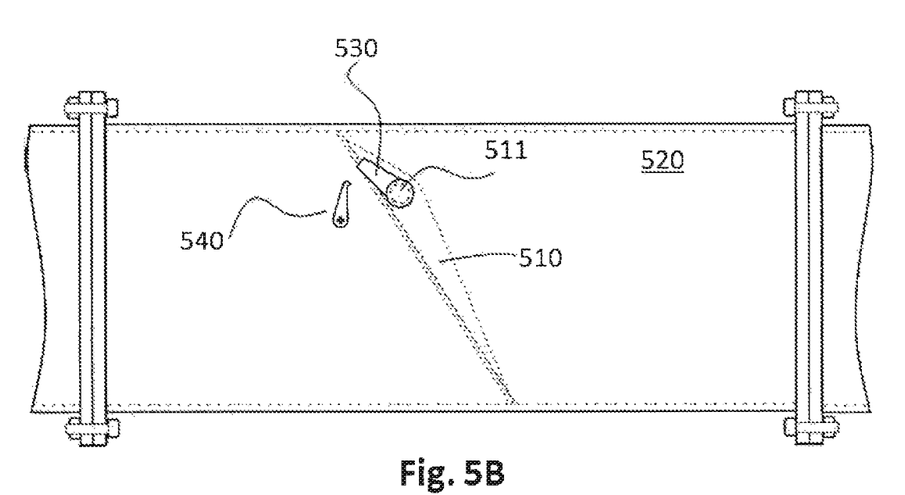
Figure 5C:
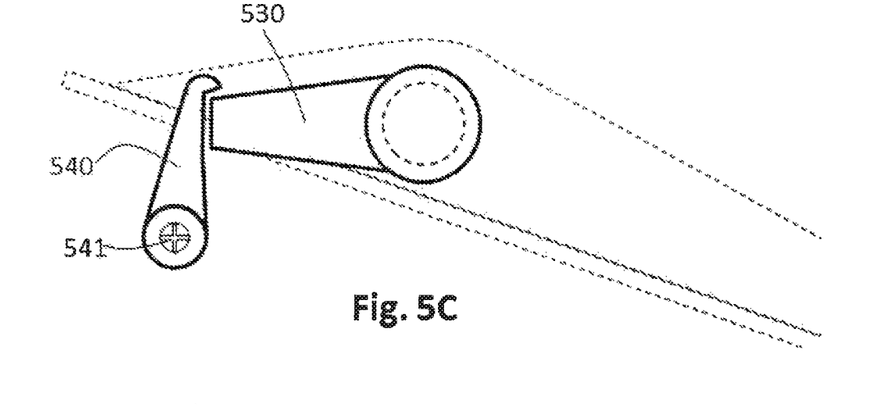
FIGS. 5C-5D provide a more detailed view of the latch mechanism illustrated in FIGS. 5A-5B.

FIGS. 5A-5D illustrate an exemplary holding mechanism for a flap valve having a flap 510 inside a conduit 520. As illustrated, the flap 510 may rotate along a rotatable shaft 511, which may extend outside of the conduit 520. An arm 530 may extend from the rotatable shaft 511. As illustrated in FIGS. 5A and 5C, a latch 540 may engage with the arm 530 to retain the shaft 511 and flap 510 in a normally open position. In the event of a deflagration in the system, the latch 540 may release (or be caused to release) the flap 510 so that it will close and seal the conduit 520.

Figure 5D:
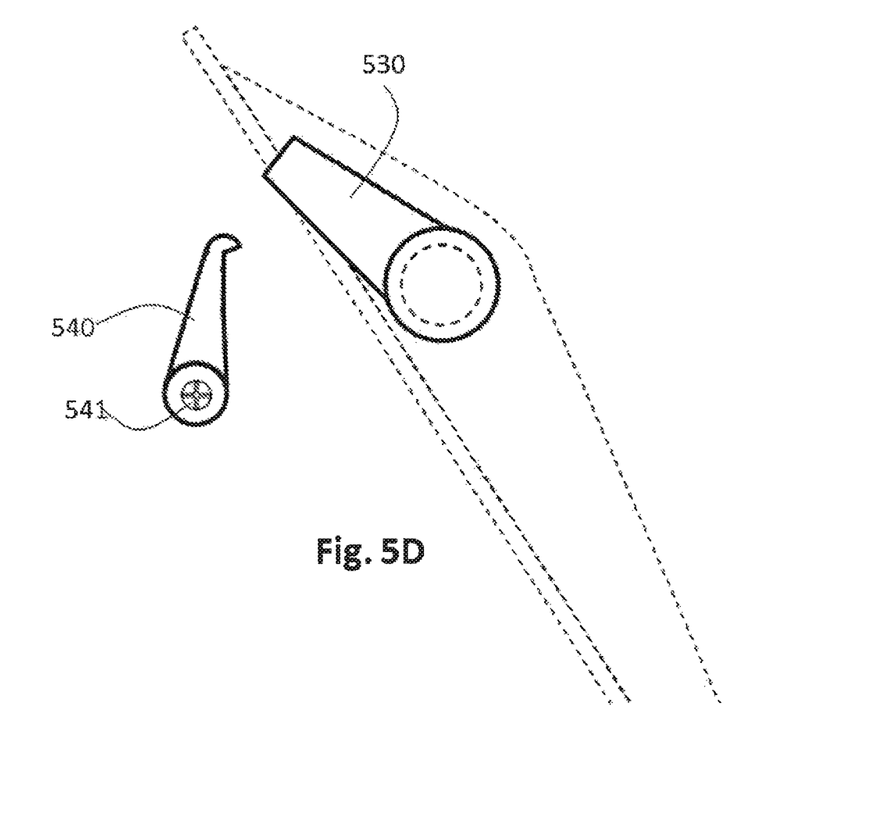

A holding mechanism, such as a latch, may be configured to be adjusted to change the force required to release the flap. For example, as illustrated in FIGS. 5C and 5D, a latch 540 may be provided with a set screw 541. The set screw 541 may be used to adjust the tension in the latch (imparted, e.g., by a spring, not shown) to change the force required to move the latch out of engagement with the arm 530.

Figure 6A:
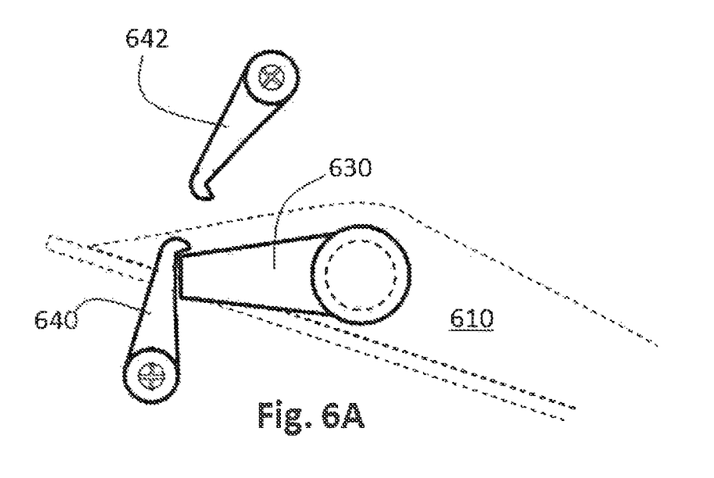
FIGS. 6A-6B illustrate a side view of a dual-latch mechanism for use with a flap valve.
Figure 6B:
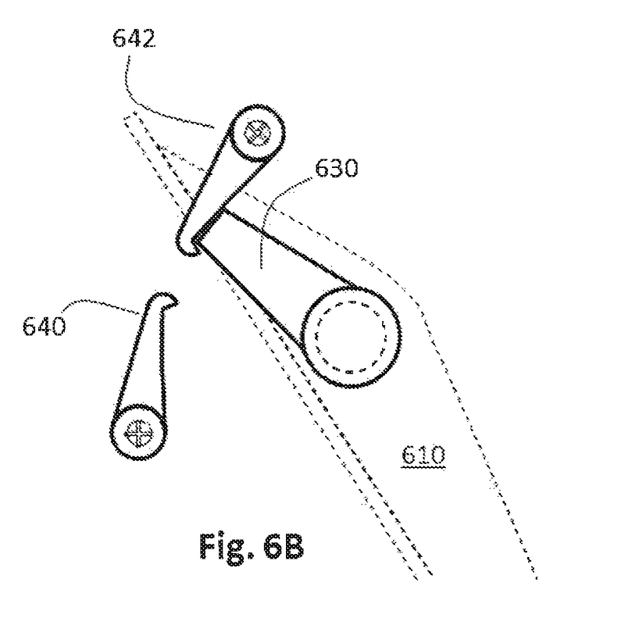

As illustrated in FIGS. 6A and 6B, it is also contemplated that a catching mechanism 642 may be provided. The catching mechanism 642, which may be a latch, may be configured to catch and hold a flap 610 in a closed position after the flap valve has closed in response to a deflagration in the system. For example, as illustrated in FIG. 6A, a holding mechanism 640 may engage with an arm 630 to maintain the flap 610 of a flap valve in a normally open position. In response to a deflagration event, the holding mechanism 640 may release the arm 630, to allow the flap valve to close. Once the flap 610 reaches a fully closed position, the catching mechanism 642 may engage with the arm 630 to prevent the flap 610 from reopening.

Figure 7:
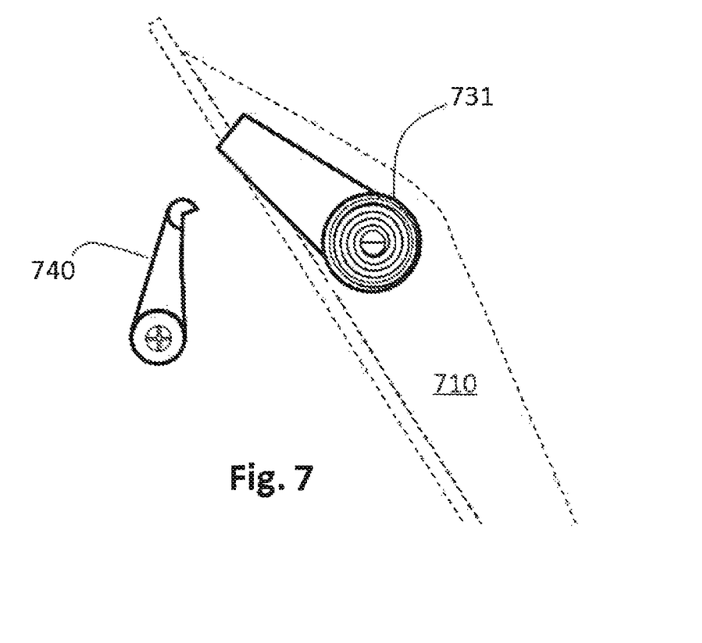
FIG. 7 illustrates a side view of a spring-loaded flap valve.

According to one embodiment of the disclosure, a normally open flap valve may be pre-loaded with a mechanism that will impart a force or moment onto the flap to encourage it to close (or to close more quickly) once released. As illustrated in FIG. 7, for example, a flap valve having a flap 710 may be provided with a pre-loading spring 731 configured to impart a moment on the flap 710. In this manner, when the normally open flap 710 is released (e.g., by releasing latch 740), the spring 731 will cause the flap 710 to rotate into a closed position.

Pre-loading a flap may provide several advantages. For example, pre-loading a flap may allow the flap to close more quickly and with greater kinetic energy, which may permit the valve to be installed closer to the protected volume (e.g., dust collector). As another example, pre-loading a flap may allow the flap to close without the assistance of gravity, as may be required when the flap valve is used in a conduit oriented vertically or other than horizontally.

Pre-loading also may provide the advantage of allowing closing of a flap valve to occur independently from the backpressure caused by a deflagration. Such independence may be desired, for example, to cause the flap to close before a deflagration pressure wave reaches the valve, or in the event that a deflagration pressure wave imparts insufficient force to close the valve without assistance. Such independence also may be advantageous in an embodiment (such as illustrated in FIGS. 2B and 3A) in which a normally open valve flap is oriented parallel to the prevailing direction of the pressure wave, thereby reducing or eliminating the pressure wave's ability to initiate closure of the flap absent preloading. Such independence also may be advantageous in an embodiment (such as illustrated in FIG. 4A) in which a normally open valve flap is positioned outside of the flow path through a conduit, which also may reduce or eliminate the pressure wave's ability to initiate closure of the flap absent preloading.

In another embodiment, a flap valve may be provided with one or more features to permit inspection of the flap valve to verify that the flap valve is in proper operating condition. For example, the flap valve may be tested or inspected to comply with the requirements imposed by standards-setting organizations (such as NFPA in the United States and CEN in Europe) to conduct periodic functionality checks of safety devices.

During system operation, particulates may accumulate on a flap of a flap valve, effectively increasing the flap's mass and inertia, and altering its operational characteristics. A heavier flap will, for example, require greater air flow to push the flap open. As another example, a heavier flap will close less quickly in response to a deflagration, thereby increasing the risk that flame or hot particles can propagate upstream before the flap valve can fully close. It is also possible that the flap of a flap valve may wear over time, e.g., if used as part of a process in which abrasive materials are present. Abrasion of a flap may effectively decrease its mass and inertia. The present disclosure contemplates providing a mechanism to allow an operator to determine whether the mass of the flap has changed.

Figure 8:
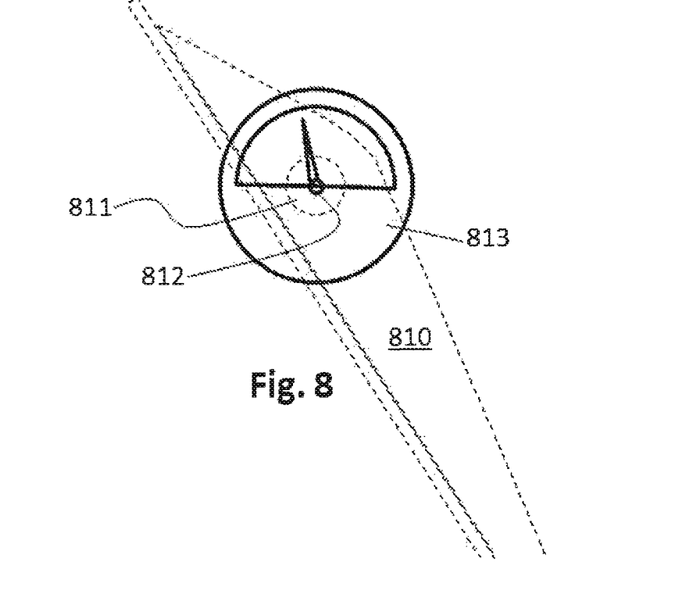
FIG. 8 illustrates a side view of a flap valve having a torque gauge.

For example, as illustrated in FIG. 8, a flap valve may have a flap 810 configured to rotate about a shaft 811. The shaft 811 may include an extension 812 extending externally from the conduit. By measuring the torque on the extension 812, a user may determine the torque acting on the shaft 811 and flap 810. Changes in those torque values may indicate whether the mass of the flap 810 has changed (e.g., due to particulate accumulation or corrosion), indicating that the valve requires maintenance or replacement. In one embodiment, a torque gauge 813 or other instrument may be used to provide visual indication of whether torque on the extension 812 is within normal limits.

It is contemplated that a flap valve may be provided with an activation mechanism that will trigger the valve to close. In this manner, the flap valve may actively respond to a measured condition. For example, as discussed above, a normally open flap valve may include a holding mechanism configured to hold a flap open. Whereas a passive flap valve may rely simply on a deflagration back pressure to force the holding mechanism to release the flap, an active flap valve may use another mechanism to cause the holding mechanism to release the flap.

Figure 9A:
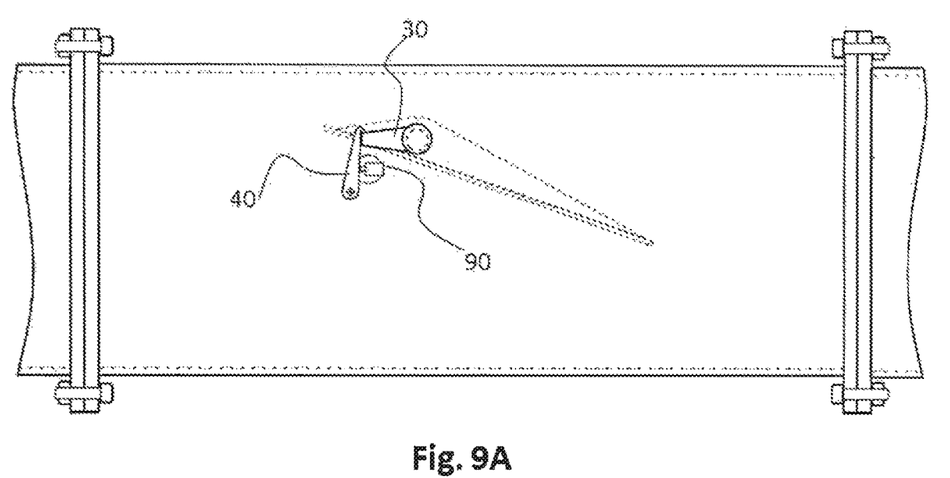
FIG. 9A illustrates a side view of an actuated latch mechanism for use with a normally-open flap valve.
Figure 9B:
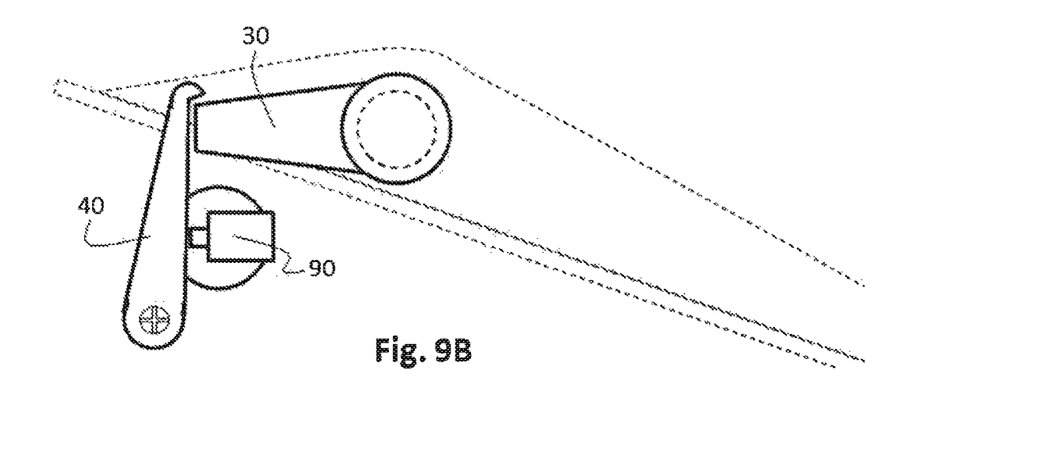
FIG. 9B provides a more detailed view of the actuated latch mechanism of FIG. 9A.

One exemplary embodiment of an active flap valve is illustrated in FIGS. 9A and 9B. A flap valve may be held in a normally open position (FIG. 9A) by way of a holding mechanism, such as a latch 40 engaged with an arm 30, similarly to the latch mechanism illustrated in FIGS. 5A-5D above. An activating mechanism 90 is also provided, engaged with the latch 40. In the event that a deflagration is detected (as discussed below), the activating mechanism 90 may activate, forcing the latch 40 out of engagement with the arm 30, and allowing the flap to close.

To sense a deflagration in the system, one or more sensors (not shown in FIGS. 9A and 9B) may be used. Such sensors may include, for example, sensors to measure changes in relative pressure, temperature, radiation (including visible light and UV radiation), or other conditions that may indicate that a deflagration has occurred or is likely to occur within the system. In one embodiment, the deflagration sensor(s) may communicate with a controller, which will determine whether the sensor(s) measurement(s) indicate a deflagration. Once the controller determines that a deflagration has occurred or is likely to occur, the controller may send a signal to the activating mechanism (e.g., 90 in FIGS. 9A and 9B) to cause the activating mechanism to activate. A controller may also be used to provide an indication that a flap valve is operating properly, trigger an alarm to indicate that a deflagration has been sensed and/or that a flap valve has activated, and to shut down the system when a deflagration is sensed and/or when a flap valve has been activated.

In another embodiment, one or more deflagration sensors may communicate directly with the activating mechanism (e.g., 90 in FIGS. 9A and 9B) without the use of an intervening controller. In such an embodiment, the sensor(s) may generate a signal upon detection of a deflagration, and the activating mechanism may activate in response to receiving that signal.

In one embodiment, one or more deflagration sensors may be positioned downstream and upstream from the flap valve. In this manner, an active flap valve may be triggered to isolate an explosion occurring on either side (upstream or downstream) of the valve.

Figure 10A:
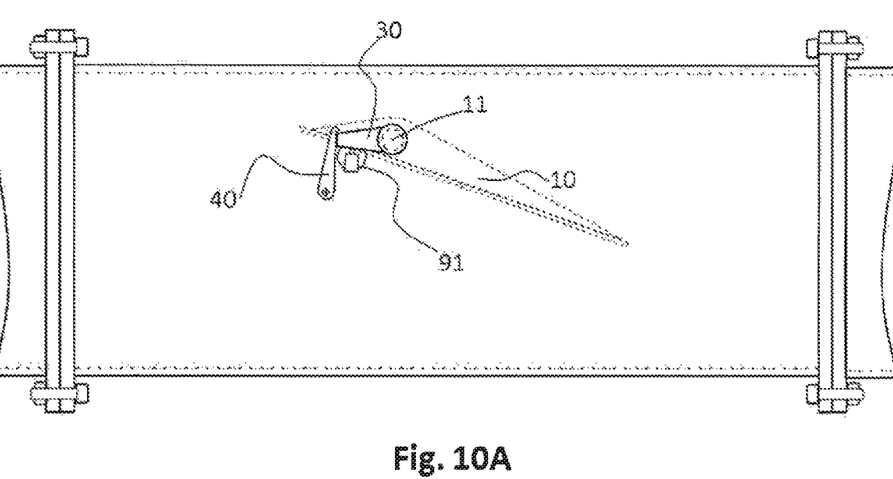
FIG. 10A illustrates a side view of another embodiment of an actuated latch mechanism for use with a normally-open flap valve.
Figure 10B:
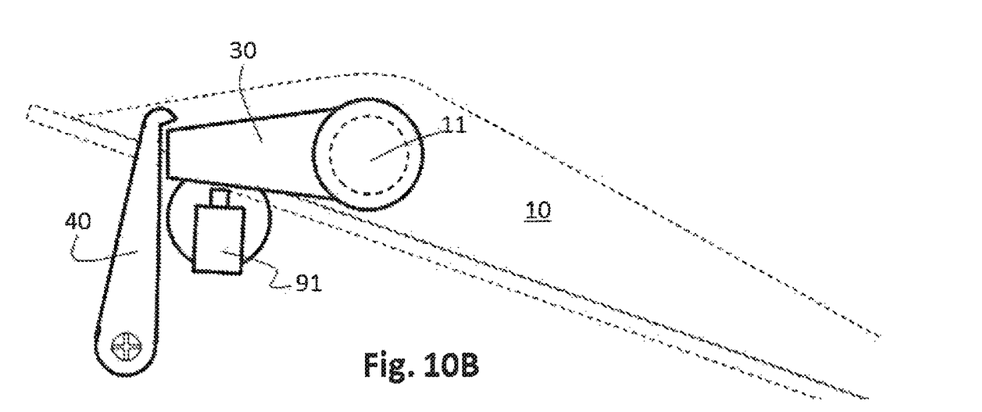
FIG. 10B provides a more detailed view of the actuated latch mechanism of FIG. 10A.

Although the activating mechanism 90 in FIGS. 9A and 9B is depicted as interacting with the holding mechanism (latch 40), the disclosure is not limited to that configuration. For example, as illustrated in FIGS. 10A and 10B, an activating mechanism 91 may interact with the flap assembly. As depicted, the activating mechanism 91 is engaged with the arm 30 extending from the rotatable shaft 11 to which the valve flap 10 is connected. When a deflagration is sensed (as discussed above), the activating mechanism 91 may activate to impart a closing force on the arm 30. That closing force may overcome the holding force of the latch 40, thereby causing the latch 40 to release the arm 30. In addition, the closing force imparted by the activating mechanism 91 may aid in moving the flap 10 into the closed position and holding the flap 10 in the closed position.

Figure 11:
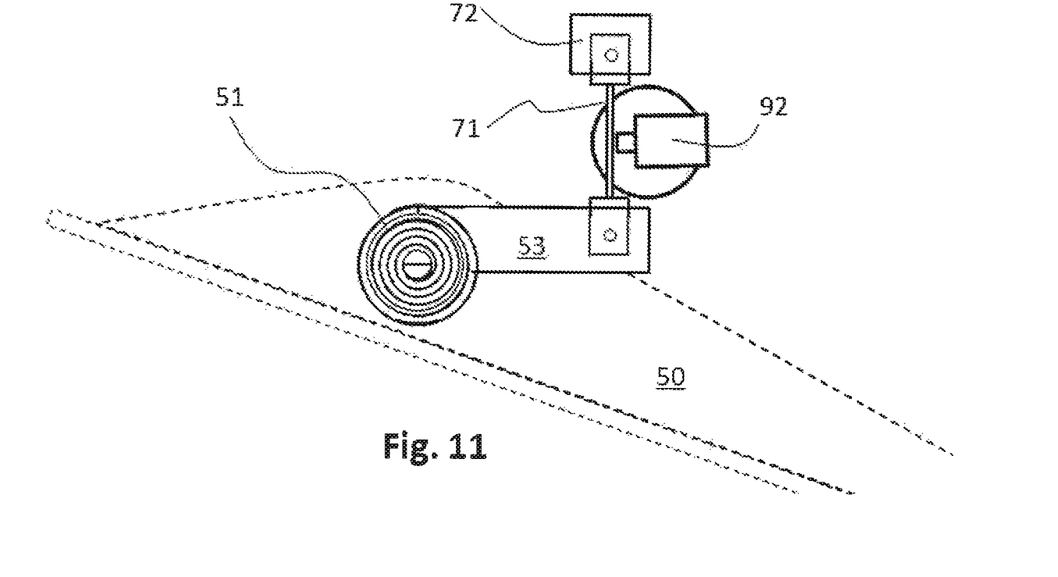
FIG. 11 illustrates a side view of a flap valve held in a normally open position by a tensile failure member.
Figure 12:
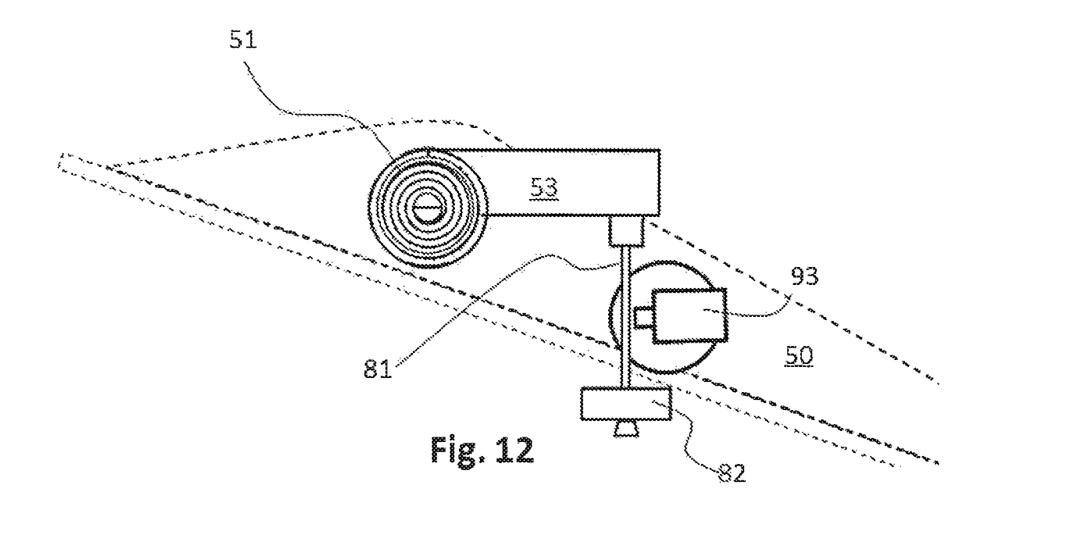
FIG. 12 illustrates a side view of a flap valve held in a normally open position by a compressive failure member.

Additional embodiments of an activating mechanism are depicted in FIGS. 11 and 12. In both of FIGS. 11 and 12, a valve flap 50 is preloaded with a spring 51, and an arm 53 extends from a valve shaft 52. In FIG. 11, a tensile failure member 71 is held in tension between the arm 53 and a mount 72. In response to a signal indicating a deflagration in the system, an activating mechanism 92 may cause the failure member 71 to fail, thereby releasing the flap 50 to close. In FIG. 12, a compressive failure member 81 is held in compression between the arm 53 and a mount 82. In response to a signal indicating a deflagration in the system, an activating mechanism 93 may cause the failure member 81 to fail, thereby releasing the flap 50 to close.

In FIGS. 9A-12, the activating mechanism (90, 91, 92, 93) is depicted as an electrically triggered piston actuator, such as a Metron actuator, which forces out or retracts a piston/plunger when triggered. Any other suitable actuator may alternatively be used as an activating mechanism. For example, a chemical gas-generating actuator (similar to known vehicle airbag actuators) may be used to cause a holding mechanism to release a normally open flap valve, or to impart a force on a normally open flap valve to overcome a holding mechanism. A chemical gas-generating actuator may also be used in conjunction with a physical piston/plunger element, such that a generated gas causes movement of the piston/plunger element. As another example, an activating mechanism may take the form of a spring initially held in compression by a latch. When the latch is removed, the spring may expand to cause the valve flap to be released and/or to close. In addition, it is contemplated that multiple actuators may be used (e.g., multiple Metron actuators or multiple actuators of various types). Multiple activating mechanisms may provide redundant functionality as a fail-safe measure. Additionally or alternatively, multiple activating mechanisms may operate cooperatively to trigger the release of a holding mechanism and/or the closing of a flap valve. In one embodiment, for example, one activating mechanism may cause a latch to release, and another activating mechanism may force the flap into the closed position.

Figure 13:
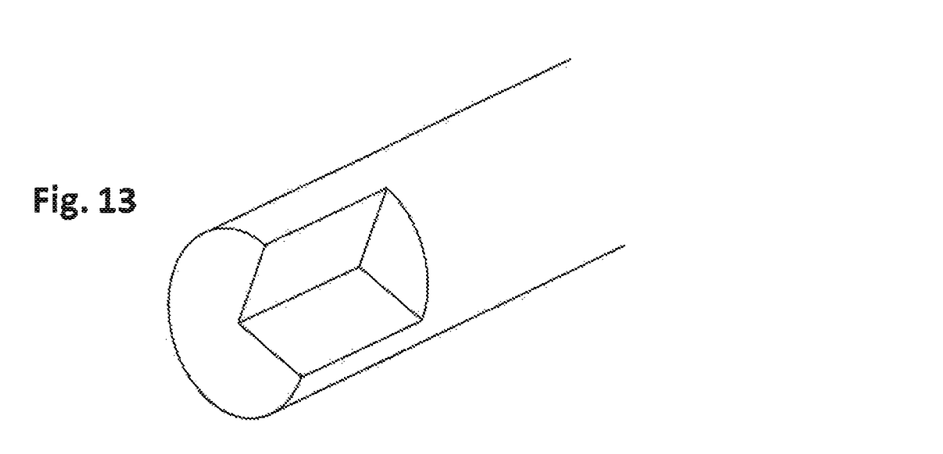
FIG. 13 illustrates a perspective view of a notched rotatable shaft for use with a flap valve.
Figure 14A:
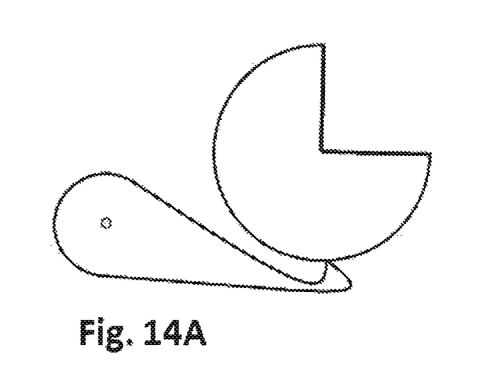
FIGS. 14A-14B illustrate a side view of a latch configured to engage with the notched rotatable shaft shown in FIG. 13.
Figure 14B:
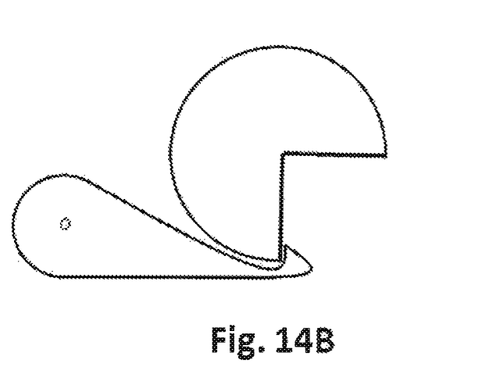
Figure 15:
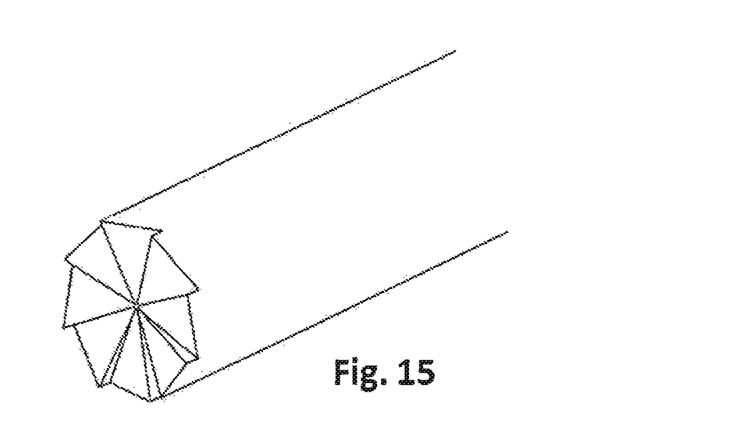
FIG. 15 illustrates a perspective view of another embodiment of a rotatable shaft for use with a flap valve.

In various embodiments discussed above, a latch is depicted as engaging with an arm. The disclosure further contemplates other configurations. For example, as illustrated in FIG. 13, a rotating shaft may be provided with a notch. The notch may disengage (FIG. 14A) or engage (FIG. 14B) with a holding mechanism (e.g., a latch) to hold a flap valve in an open position before activating and/or in a closed position after activating. It is further contemplated that a rotating shaft may be provided with one or more teeth, as illustrated in FIG. 15. Such teeth may engage with a ratchet or clutch to hold a flap valve in an open position before activating and/or in a closed position after activating.

Flap valves according to the present disclosure may be used in systems having a variety of design pressures. A disclosed flap valve may be used, for example, in systems having design pressures of at least 0.3 bar, 0.5 bar, 1 bar, 10 bar, or 12 bar.

Figure 16A:
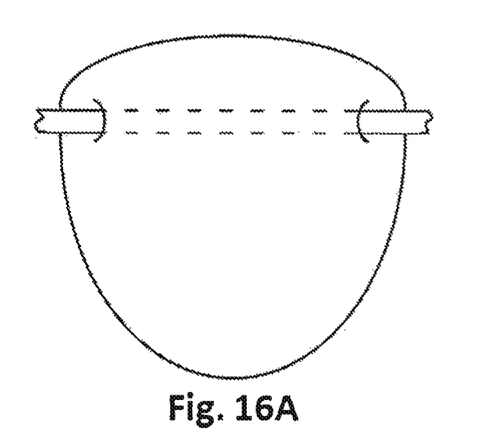
FIGS. 16A-16C illustrate perspective views of differently shaped flap valves.
Figure 16B:
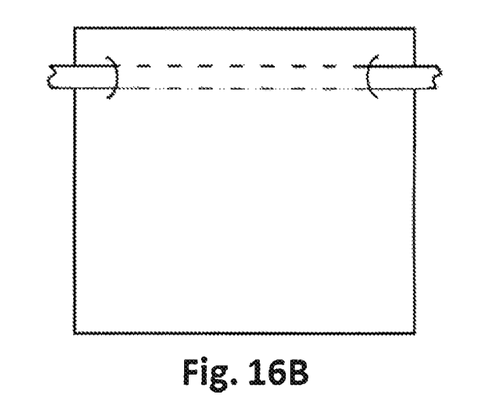
Figure 16C:
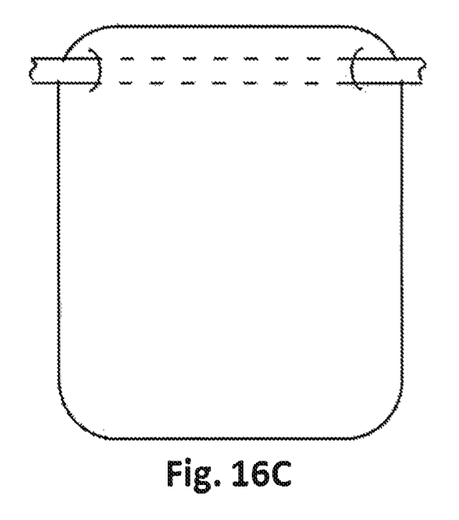

The flap of a flap valve may take any number of suitable shapes. As one example, a flap may exhibit a rounded or partially rounded shape as illustrated in FIG. 16A and FIG. 16C. As another example, a flap may exhibit a rectangular or square shape, as illustrated in FIG. 16B. It is contemplated that a flap valve may be shaped as needed for use in conduits and/or piping of various shapes and sizes. A flap valve may, for example, be used in a pipe having a generally circular cross-section or in a duct having a generally rectangular cross-section.

In the illustrated embodiments, a flap valve assembly has typically been depicted with flanges to permit installation within flanged piping or ducting system. It is also contemplated that a flap valve assembly may be installed into a system using other non-flanged mechanisms. For example, a flap valve assembly may be installed into a system using a compression tube fitting.

It is contemplated that the flap of a flap valve may be provided with features to improve the seal between the flap and the conduit when the flap valve is closed. For example, the flap may include a peripheral gasket or bushing to engage with the conduit. In another embodiment, the conduit may be provided with a gasket or bushing to engage with the flap.

It is contemplated that features described above may be retro-fitted onto preexisting flap valves. For example, a preexisting, normally-closed flap valve may be provided with a holding mechanism (e.g., a latch or a destructible failure member) to convert the flap valve into a normally-open flap valve. Additional features described herein may also be retro-fitted onto preexisting flap valves, such as pre-loading, inspectability/torque measurement, and controlled actuation.

The foregoing embodiments are exemplary only. Other embodiments will be apparent to those skilled in the art from consideration of the specification and practice of the disclosure herein.

What is claimed is:

1. An explosion isolation device, comprising:
   a conduit;
   a flap within the conduit, the flap having an upstream side and a downstream side and configured to rotate between an open position and a closed position within the conduit; and
   a holding mechanism configured to hold the flap in the open position;
   wherein the holding mechanism is configured to release the flap in the event of a deflagration;
   wherein the flap is configured to rotate into the closed position after it is released and
   wherein the flap is configured to rotate into the closed position in response to a deflagration force exerted on the downstream side of the flap sufficient to cause the holding mechanism to release.

2. The explosion isolation device of claim 1, wherein the holding mechanism is a latch, wherein the deflagration force exerted on the downstream side of the flap is a positive pressure, and wherein the flap is configured to rotate into the closed position when the positive pressure exerted on the downstream side of the flap is sufficient to overcome the force of the latch.

3. The explosion isolation device of claim 1, wherein the conduit is oriented vertically.

4. The explosion isolation device of claim 1, further comprising:
   a spring, wherein the spring is configured to impart a rotational force on the flap to cause the flap to rotate toward the closed position.

5. The explosion isolation device of claim 4, wherein the conduit is oriented vertically.

6. The explosion isolation device of claim 1, further comprising:
   at least one sensor, the at least one sensor configured to sense an explosion; and
   an actuator, wherein the actuator is configured to cause the holding mechanism to release the flap when the at least one sensor senses an explosion.

7. The explosion isolation device of claim 6, wherein the actuator is further configured to rotate the flap toward the closed position when the at least one sensor senses an explosion.

8. The explosion isolation device of claim 6, wherein the actuator comprises an electrically triggered piston actuator.

9. The explosion isolation device of claim 6, wherein the actuator comprises a chemical gas generator.

10. The explosion isolation device of claim 1, wherein the conduit defines a flow path having an upstream direction and a downstream direction, and wherein the at least one sensor comprises at least a first sensor and a second sensor;
    wherein the first sensor is configured to detect an explosion in the upstream direction from the flap; and
    wherein the second sensor is configured to detect an explosion in the downstream direction from the flap.

11. The explosion isolation device of claim 1, wherein the valve flap has the ability to retain a pressure of at least 0.3 bar.

12. The explosion isolation device of claim 1, wherein the valve flap has the ability to retain a pressure of at least 0.5 bar.

13. The explosion isolation device of claim 1, wherein the valve flap has the ability to retain a pressure of at least 1 bar.

14. The explosion isolation device of claim 1, wherein the valve flap has the ability to retain a pressure of at least 10 bar.

15. The explosion isolation device of claim 1, wherein the valve flap has the ability to retain a pressure of at least 12 bar.

16. The explosion isolation device of claim 1, wherein the holding mechanism is a destructible failure member, wherein the deflagration force exerted on the downstream side of the flap is a positive pressure, and wherein the flap is configured to rotate into the closed position when the positive pressure exerted on the downstream side of the flap is sufficient to cause the destructible member to fail.

* * * * *